United States Patent [19]

Bansal et al.

[11] 4,117,830
[45] Oct. 3, 1978

[54] GANGABLE RADIANT ENERGY COLLECTOR

[76] Inventors: Jag M. Bansal; Anil Kumar, both of 1301 Highway No. 7, Hopkins, Minn. 55343

[21] Appl. No.: 773,297

[22] Filed: Mar. 1, 1977

Related U.S. Application Data

[63] Continuation-in-part of Ser. No. 746,547, Dec. 1, 1976.

[51] Int. Cl.² .............................................. F24J 3/02
[52] U.S. Cl. .................................. 126/271; 126/270; 165/66
[58] Field of Search ............... 126/270, 271; 237/1 A; 165/172–176, 66

[56] References Cited

U.S. PATENT DOCUMENTS

| | | | |
|---|---|---|---|
| 2,705,948 | 4/1955 | Rostock | 126/271 |
| 2,907,318 | 10/1959 | Awot | 126/271 |
| 3,981,294 | 9/1976 | Deminet et al. | 126/271 |
| 4,007,729 | 2/1977 | Chao et al. | 126/271 |
| 4,030,477 | 6/1977 | Smith | 126/271 |

*Primary Examiner*—Kenneth W. Sprague
*Assistant Examiner*—James C. Yeung

*Attorney, Agent, or Firm*—Williamson, Bains, Moore & Hansen

[57] ABSTRACT

A gangable solar energy collector module utilizes an insulative housing containing a plurality of hollow interior conduits confronting the sun, separated from one another by slots, and overlying an energy absorbing tank which is connected with the conduits to permit flow of heat transfer medium therebetween. The conduits and underlying energy absorbing tank are positioned between supply and return ducts which extend beneath the conduits so that solar energy passing through the slots strikes the ducts and is either absorbed or reflected upwardly toward the conduits for absorption by the conduits. Each supply and return duct has a central segment within the insulative housing and has a terminal segment at each end of the central segment, each terminal segment being thermally insulated from the central segment and extending through and outwardly from the housing to permit a plurality of such collectors to be ganged by series connecting all supply ducts and series connecting all return ducts. The insulative housing is divided into a series of internal subchambers by a plurality of generally parallel convection-inhibiting panels which extend transversely to the conduits and are spaced from one another along the conduits to inhibit convection currents within the housing.

15 Claims, 6 Drawing Figures

GANGABLE RADIANT ENERGY COLLECTOR

CROSS REFERENCE TO RELATED APPLICATION

This is a continuation-in-part application based on U.S. patent application Ser. No. 746,547 filed Dec. 1, 1976 and entitled "Energy Collector for Collecting Solar Energy and the Like" by Jag M. Bansal and Anil Kumar.

BACKGROUND OF THE INVENTION

This invention relates to the field of energy collectors usable for collecting of solar energy and other radiant energy and provides a substantially improved energy collector module which is readily gangable with a plurality of like modules with a minimum of labor at the final construction site.

With increased interest in solar energy utilization for the heating of buildings, efforts have increased to develop a solar energy collector module capable of absorbing as much incident solar energy as possible while minimizing the quantity of energy escaping the collector. Beside the need to improve the quality of individual solar collectors, it is desirable to make such collectors compatible with other collectors so that quantities of individual collectors can be ganged.

While it is known to gang a plurality of solar collectors, the problems associated with ganging have been sufficient to discourage large scale commercial production of gangable solar collectors. Presently, individual solar collectors are commonly assembled and ganged at the construction site and the insulative housing which must surround the collectors to retain captured energy is often assembled and insulated under field conditions which invariably do not approach the quality control standards which can be maintained in a factory assembly environment. It is usually extremely difficult to effectively close, thoroughly insulate and reliably seal the insulative housings of collectors at the construction site and the result is that housings so constructed are commonly drafty, unreliable, and subject to substantial heat loss to the ambient environment.

The presently known gangable collectors utilize a collector and a pair of continuous ducts which extend from an insulative housing surrounding the collector. One shortcoming of such a structure is that their continuous ducts which extend through the walls of the housing define a heat sink along which heat from within the housing is conducted from the inside of the housing to the outside, where it is lost to the atmosphere. It would be desirable to have a ganging apparatus which minimizes such heat loss.

Still another problem associated with presently known gangable collectors is that the continuous ducting already described and which attaches to a solar collector within the housing, undergoes substantial thermal expansion and contraction in response to temperature changes in the housing. Such thermal expansion causes movement of the ducts relative to the housing and eventually causes breakdown of the insulative seal between housing and duct, thereby substantially reducing effectiveness of the insulative housing. When a plurality of such gangable collectors are connected, the presently used continuous and relatively rigid ducts are easily jarred or twisted and such jarring can damage the seals between duct and housing and can cause interior breakage between collector and ducts. It is desirable to provide a gangable collector capable of absorbing some rough handling at the construction site without damage to the integrity of its insulative housing or interior connection.

Still another difficulty encountered in the ganging of a system of collectors is that the commonly used liquid or gaseous heat transfer medium tends to circulate more readily through solar collectors near the location at which the heat transfer medium is pumped into the system and tends to resist circulation through solar collectors further downstream. It is difficult at the time of manufacture to design or adjust individual collectors to work well in combination with a particular number of ganged collectors because usually it is not known at the time of manufacture how many solar collectors will be ganged and in precisely what arrangement. Because of these uncertainties, extensive adjustment and manipulation of collectors has been necessary at the construction site in order to make the ganged solar collectors function efficiently as a group. In the past, such adjustment has required opening the insulative housings of individual collectors to make internal adjustments relating to flow of heat transfer medium, and opening the housings reduces the quality of the insulation therein and the overall effectiveness of the housing. Accordingly, it would be desirable to provide a solar collector which may be easily adjusted at the job site to facilitate its placement in tandem with other collectors but without the requirement of opening the housing.

Still another problem encountered with many known solar collectors is the often extension internal convection currents which occur within the housing and which tends to cool the collector. The output side of the solar collector will always be at a higher temperature than the input side and this imbalance generates convection currents therebetween. It is desirable to minimize these convection currents to make the collector more efficient. These problems and the earlier described shortcomings of most known collectors are substantially alleviated by the invention disclosed herein.

SUMMARY OF THE INVENTION

The present invention comprises an improved, more efficient solar energy collector module which may be readily mass produced under factory assembly line conditions and which is particularly adapted to ganging with other such modules at the construction site.

The improved solar collector module is provided with a ganging apparatus so as to easily and rapidly join adjacent collector modules for multi-collector operation. Each collector is contained within an insulative housing and is provided with a supply duct and return duct connected in fluid flow relationship to the collector to conduct heat transfer medium along the ducts and through the collector. The supply and return ducts are positioned primarily within a plenum chamber defined by an insulative housing but pass through and extend outwardly from the housing.

Each duct comprises a central segment wholly within the housing and terminal segments which pass through the housing wall and extend outwardly for connection to terminal segments associated with adjacent modules. The terminal segments of each duct are connected with the intermediate central segments in fluid-flow relation by thermally insulative connectors, assuring that the heat collected within the housing is not transferred along the duct by conduction and out of the housing.

The insulative connectors also provide a flexibility link between the center and terminal segments so that thermal expansion and contraction do not cause breakage of the ducts or degeneration of the seal between the ducts and the housing.

The housing has a transparent or translucent window through which radiant energy enters the housing and is incident on the collector. Preferably, the collector has upper and lower stages, the upper stage being comprised of a plurality of generally parallel, spaced-apart, hollow conduits through which heat transfer medium flows, the individual conduits being separated by slots through which radiant energy may pass downwardly to the second stage. The second stage of the collector is preferably a tank-like unit positioned below the slots of receive radiant energy and absorb most of such energy. Some of the energy incident on the second stage is absorbed and some reflected toward the conduits above to increase the radiation intensity at the conduits. The already described supply and return ducts are also positioned below the conduits and confront the energy source through the slots so as to receive energy from the energy source by absorption and to cause energy not absorbed to be reflected upwardly toward the conduits for further absorption by the conduits.

Within the plenum chamber defined by the housing, a plurality of mutually parallel, generally transparent convection inhibiting panels are positioned. These panels are spaced from one another and generally perpendicular to the conduits of the first stage to define a plurality of subchambers positioned successively along the conduits. Because the downstream end of the conduits is inevitably at a higher temperature than the upstream end, disruptive and wasteful convection currents occur within the housing in the absence of the described convection inhibiting panels. Placement of the described panels subdivides the chamber into isolated subchambers and attenuates such convection currents.

The invention provides an integral energy collector module which may be manufactured at the factory and carefully insulated and sealed for shipment to the construction site. A plurality of such collector modules may then be ganged at the site and interconnected for flow of heat transfer medium through the collectors by simply connecting the supply ducts in series and the return ducts in series without need for entry within the housing. Flow control means are provided in each collector module to permit control of the amount of heat transfer medium moving from the ducts through individual collectors to assure that collectors have approximately the same quantity of heat transfer medium flowing through each regardless of its distance from the circulating pump and that such fluid-flow is not concentrated in collectors adjacent the pump.

The advantages and novel features which characterize the invention are set out with particularity in the claims attached hereto and forming a part of this description. For a full understanding of the invention and the objects and advantages obtained through its use, reference should be made to the drawings which form a further part hereof and to the accompanying description in which is illustrated and described the preferred embodiment of the invention.

DESCRIPTION OF THE PREFERRED EMBODIMENT

Figure 1:
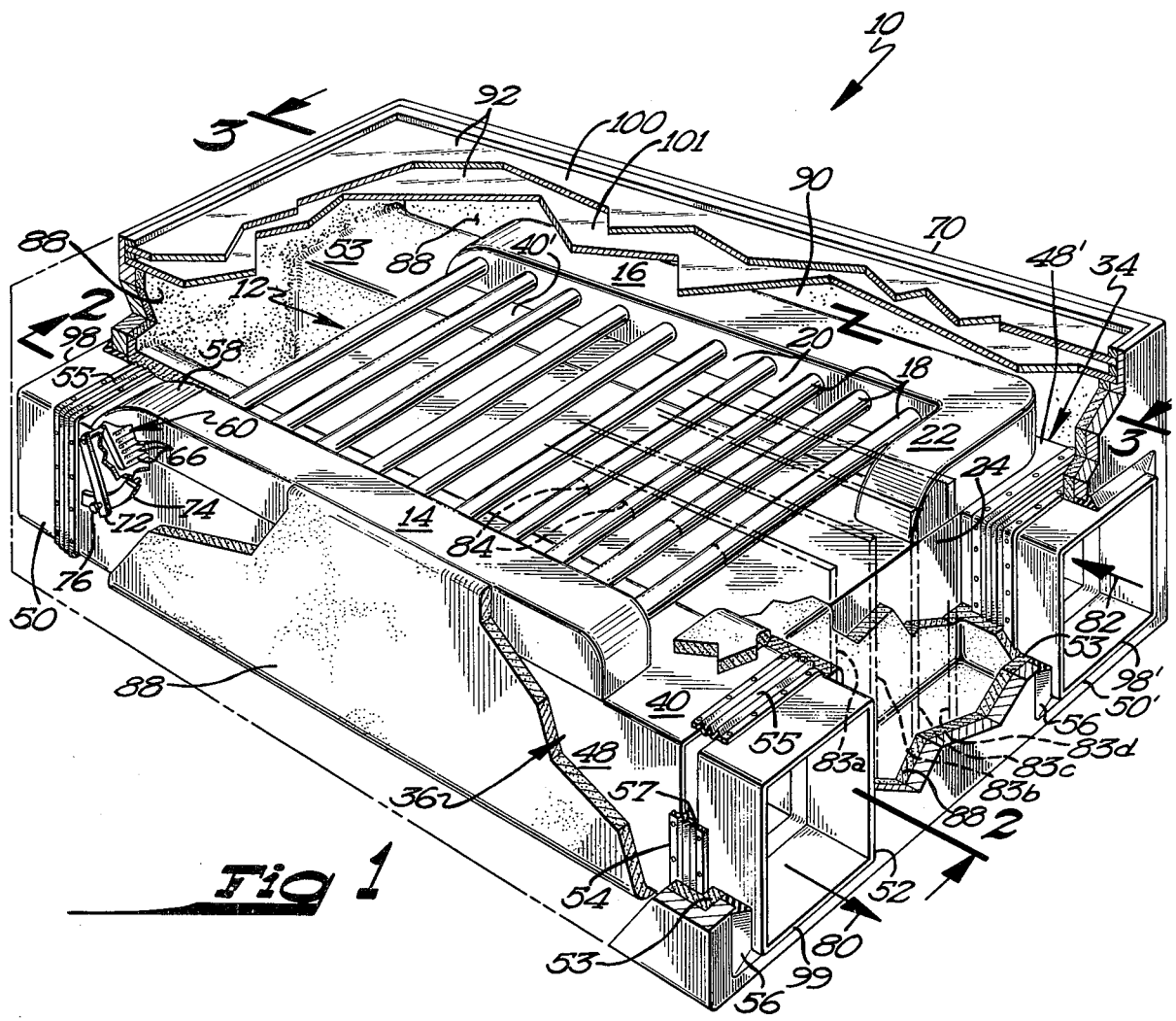
FIG. 1 is a perspective drawing partially cutaway and partially in phantom, a gangable radiant energy collector module embodying the invention.

Referring now to FIGS. 1-5 a gangable radiant energy collector module 10 embodying the invention is here shown with a two stage collector 12 of a type disclosed in detail in copending U.S. Pat. application Ser. No. 746,547, filed Dec. 1, 1976 for "Energy Collector for Collecting Solar Energy and the Like" by Jag M. Bansal and Anil Kumar. The collector 12 contained in insulative housing 70, has a first radiation absorbing means comprising an intake manifold 14, outlet manifold 16 and a plurality of hollow-interior, mutually parallel, energy absorbing conduits 18 extending therebetween and separated from one another by slots 20. Heat transfer medium 62 is delivered to inlet 58 of intake manifold 14 from supply duct 36, described in detail hereafter.

The conduits 18 are connected in fluid-flow relation with the manifolds 4 and 16 to permit flow of a heat transfer medium 62, including either gaseous or liquid mediums, from the intake manifold 14, along the plurality of hollow-interior conduits 18 and thence into the outlet manifold 16, the heat transfer medium absorbing heat from the walls of manifolds 14 and 16 and from conduits 18, the walls of which have been warmed by solar or other radiant energy incident thereon.

The outlet manifold 16 has an extension 22 which conducts heat transfer medium from the outlet manifold 16 to a second radiation absorbing means which may comprise a tank 24 underlying the first absorbing means and on which radiant energy 42 is incident after passing through the slots 20 between the conduits 18. The tank 24 has its interior 25 provided with spaced-apart, offset baffles 26 through 30 to guide the flow of heat transfer medium along a path through the tank as shown by flow arrows in FIG. 4. Heat transfer medium 62 leaves the tank 24 through outlet 32 and enters substantially larger return duct 34.

A detailed description of the construction and operation of the collector 12 is contained in the described copending application and accordingly will not be repeated here, but it should be understood that although use of the collector disclosed in the copending application is preferred with the collector module described herein, other collectors having many diverse constructions and arrangements, may be used with the disclosed module and are within the purview of the invention. It is preferred, however, that the collector used with the module have a plurality of slots through which radiant energy may be incident on the return and supply ducts 34 and 36, respectively, both of which pass through housing 70 and will now be described in detail.

Figure 2:
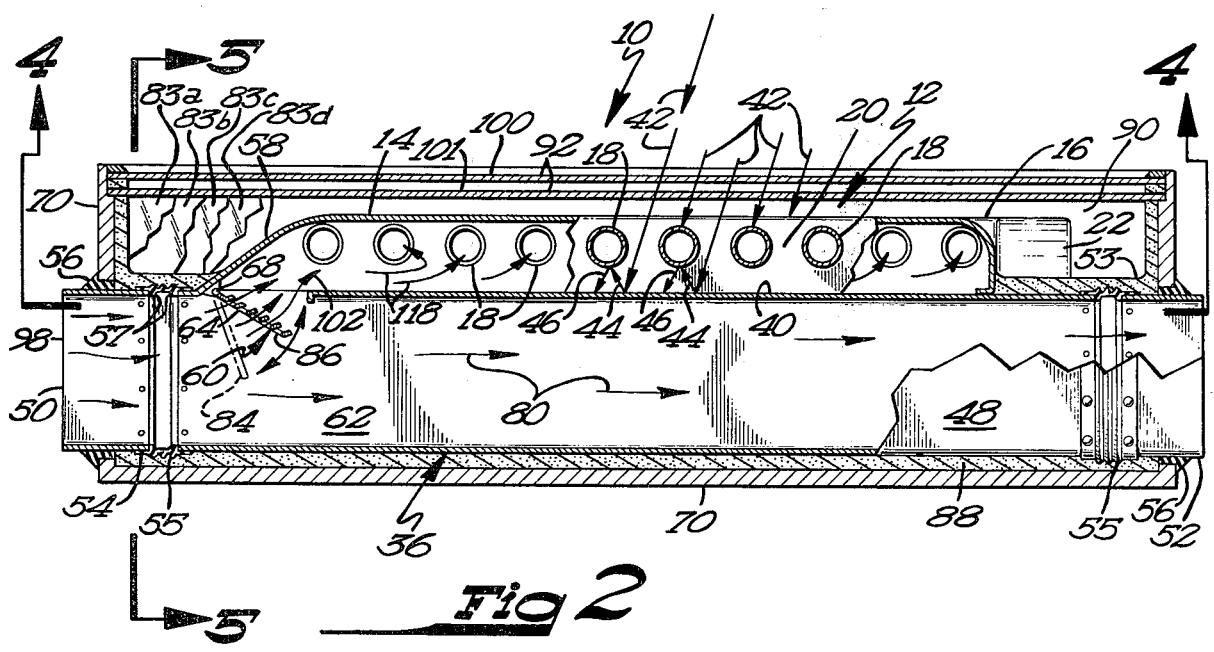
FIG. 2 is a cross sectional, partially cut away, side elevation view of the embodiment of FIG. 1 taken in the direction of cutting plane 2—2 of FIG. 1.
Figure 3:
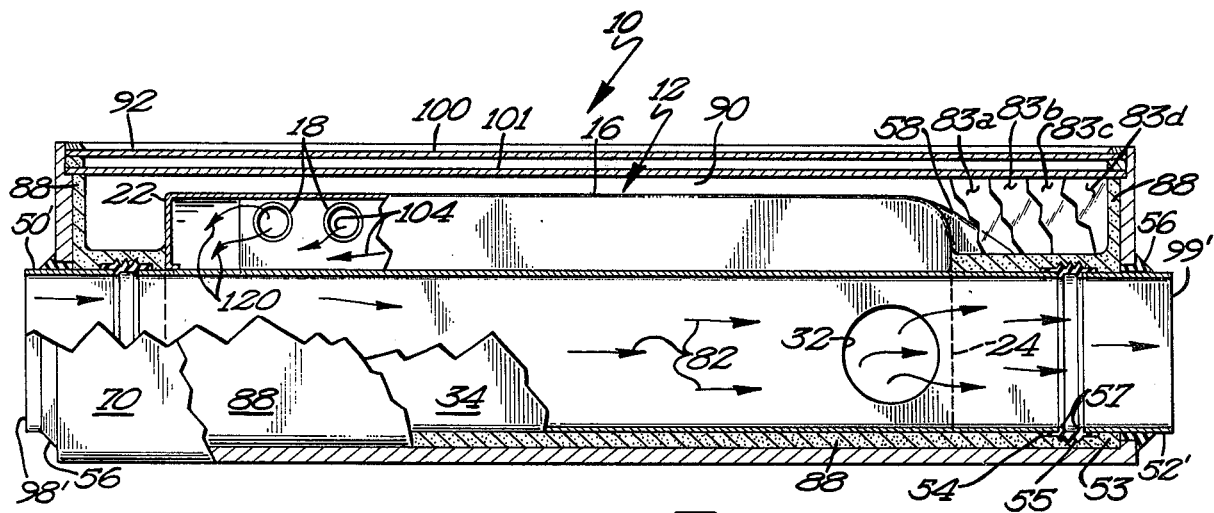
FIG. 3 is a cross-sectional, partially cutaway, rear elevation view of the embodiment of FIG. 1 taken in the direction of cutting plane 3—3 of FIG. 1.
Figure 4:
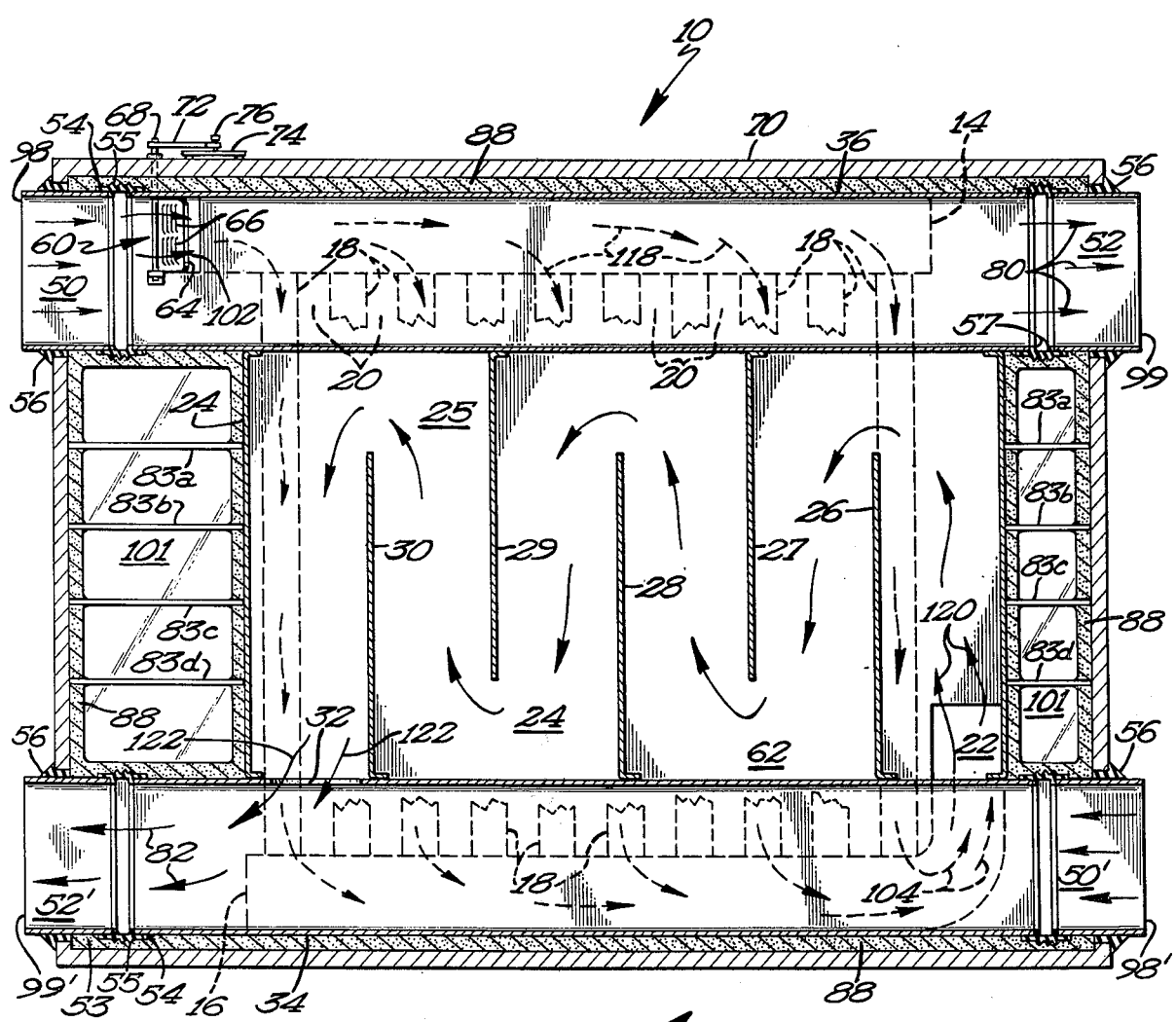
FIG. 4 is a bottom cross-sectional view of the embodiment of FIG. 1.
Figure 5:
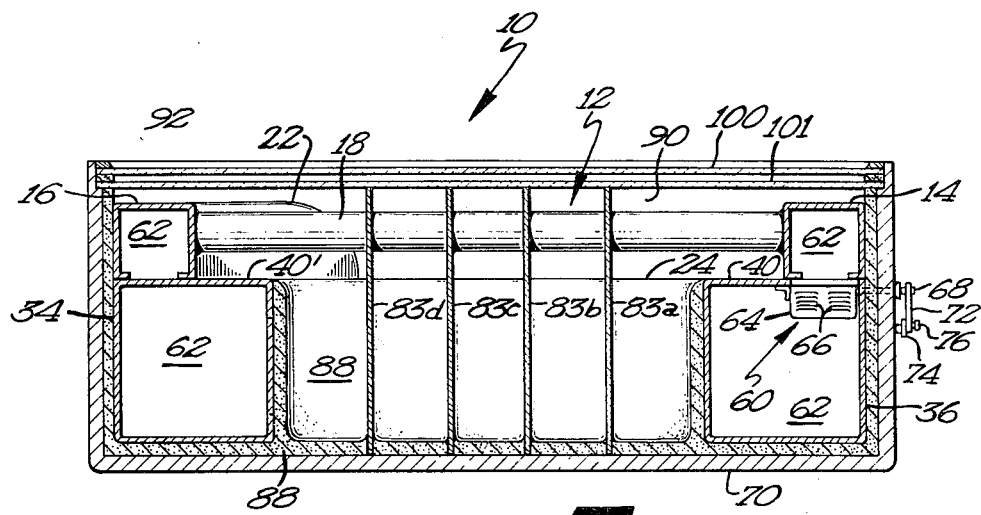
FIG. 5 is an end cross sectional view of the embodiment of FIG. 2 taken in the direction of cutting plane 5—5 of FIG. 2.

The supply duct 36 may be formed of any appropriate material for the transmission of heat transfer medium 62 therealong, although a metallic material which readily absorbs heat and conducts it to medium within the duct is preferred. The supply duct 36 is positioned beneath the conduits 18 so that solar or other radiant energy 42 passing through the slots 20 will be incident on the surface 40 which confronts the conduits 18 and the energy source, permitting the supply duct to acquire substantial amounts of heat energy which will be transferred to the medium 62 flowing along supply duct 36. While the surface 40 absorbs a substantial amount of energy, some radiant energy 44 will still be reflected upwardly from the surface 40 as best shown in FIG. 2 and a substantial portion of such reflected energy 44 is intercepted by the overlying conduits 18, is converted to heat energy at the conduit and is then absorbed by the heat transfer medium 62 within the conduits. Multiple reflections may occur between surface 40 and the conduits 18 as indicated at 46, and this further increases the capture of radiant energy.

Supply duct 36 and return duct 34 are similar in general construction and are positioned at the upstream and downstream sides, respectively, of the collector 12. In view of the substantial similarity between the ducts, the supply duct 36 will be described in detail and it should be understood that the return duct 34 is substantially identical except for its positioning and its mode of connection to the collector 12, which will be described in further detail hereafter.

Supply duct 40 is comprised of a rigid, elongated, hollow central segment 48 and adjacent terminal segments 50 and 52, the terminal segments being spaced from the central segment but connected in fluid-flow communication with opposite ends of the central segment 48 by thermally insulated, flexible connectors 54 which are attached to the segments by rivots or other fastening means. The connectors 54 may be of a rubber or synthetic material and are preferably provided with a bellows portion 55 with spacer rims 57 isolating the segments from one another and thus thermally insulating the central segment 48 from each terminal segment. It has been found desirable to provide an insulative barrier 53 of foam insulation or the like within the housing and closely surrounding the connectors 54 and the portions of the segments adjacent the connectors as well as to insulate the terminal segments from the plenum chamber 90 to thus further reduce loss of heat energy from the plenum 90. Accordingly, the disclosed supply duct 36 with its thermally isolated segments and described connectors substantially reduces conductive heat losses from the warmer central segment 48 to the terminal segments 50 and 52.

Still another purpose for isolating the terminal segments from the central segment of the supply and return ducts is that thermal expansion and contraction of the supply duct could otherwise loosen or cause deterioration of the seals 56 positioned between housing 70 and the terminal segments.

The supply duct 36 has an entrance 98 and exit 99, both being located outside housing 70, and duct 36 is connected to the intake manifold 14 at inlet 58. A swingable member 60 or other valve-like device is mounted between the supply duct 36 and the inlet 58 to regulate the quantity of heat transfer medium leaving the duct 36 and entering the manifold 14, such member or valve defining a flow control means to control the flow of heat transfer medium 62 between the duct 36 and the manifold 14. The member 60, which is illustrative of one type of flow control means, utilizes a generally flat rectangular plate 64, having a plurality of generally parallel louvers 66 therein which assist in directing the flow of heat transfer medium.

The plate 64 is fixed to a shaft 68 which is selectively swingably mounted to the supply duct 36 and extends outwardly through the wall of the supply duct and passes through the insulated sidewall of the housing 70. The shaft 68 has an arm 72 fixed thereto and extending at a right angle to the shaft axis so that an operator may continuously adjust the position of the member 60 from a first position 84, wherein medium passes freely into the collector 12, to a second position 86, wherein the plate 64 inhibits flow of medium through the collector. The end of the arm 72 is slideably mounted to a track 74 carried by the outer wall of the duct 36 and may be selectively retained at any location along the track by the tightening of set screw 76. Accordingly, the amount of the heat transfer fluid leaving the dut 36 and entering the intake manifold 14 of the collector may be controlled by swinging of the arm 72 about the axis of shaft 68 by an operator from outside the housing 70. Such adjustment is desirable when ganging a substantial number of collector modules 10. While the flow control means has been shown as being located at the juncture of duct 36 and the collector 12, it should be understood that the flow control mans may be positioned at any location where flow into or out of the collector 12 may be regulated, including the juncture between return duct 34 and collector 12, and such alternative positions are within the purview of the invention.

The return duct 34, like supply duct 36, has a central segment 48' and terminal segments 50' and 52', the segments being joined by connectors 54, as described in conjunction with duct 36. The terminal segments 50' and 52' of duct 34 pass through the housing 70 and terminate in entrance 98' and exit 99' respectively. The segments 50' and 52' are tightly sealed to the housing by seals 56 as was described in conjunction with the supply duct 36. In addition, the terminal segments 50' and 52' are well-insulated from the plenum chamber 70 within the housing by means of insulative barrier 53.

The return duct 34 has an upper surface 40' which confronts the energy source and underlies the spaced-apart conduits 18 so as to receive solar radiation through the slots 20 and absorb a substantial portion of such radiation. Both ducts 34 and 36 are coated with an energy absorbing coating such as a blackening agent so as to maximize absorption. As was described in conjunction with the surface 40 of duct 36, all incident radiation will not be absorbed by the surface 40' and the described reflections 44 and 46 which result in increased radiation absorption by the conduits 18 and surface 40 also occur between surface 40' and the conduits 18. Accordingly, the surfaces 40 and 40', each of which are preferably planer, collectively define reflector means for reflecting radiant energy toward the overlying conduits.

The return duct 34 has an aperture 32 which communicates directly with the tank 24 and through which heat transfer medium may flow from the tank 24 into the return duct 34. It can thus be understood that heat transfer medium will enter the supply duct 36, flowing in the direction 80, some of which will be diverted through inlet 58 and thence through collector 12. Heat transfer medium will leave the collector 12 through aperture 78 and enter the return duct 34 after which the heat transfer medium will move along duct 34 in direction 82.

While the supply and return ducts 36 and 34 are shown as being of generally rectangular cross section, it should be understood that other geometrical configurations may be substituted and are within the purview of the invention.

While the terminal segments 50 and 52, as well as 50' and 52' have been shown as extending in a straight-line direction defined by the elongated central segments 36 or 34, it should be understood that at times it is desirable to utilize terminal segments which turn through right angles or other angles to better facilitate coupling of the modules 10 with other adjacent similarly constructed modules, and that such variations in angular configuration of the terminal segments are contemplated and within the purview of the present invention.

Accordingly, the ducts 34 and 36 along with the connections needed to join them to the collector 12 and the housing 70 collectively comprise a ganging apparatus by which a module 10 may be ganged with other modules provided with compatible ganging apparatuses.

A plurality of spaced-apart, mutually parallel, transparent convection-inhibiting panels 83a-d run from end to end of the plenum chamber 90 and from top to bottom thereof, each such panel having a plurality of aligned apertures 84 equal in number to the number of conduits 18 and through which the conduits 18 are passed during the assembly of the collector. These spaced-apart panels 83a-83d divide the plenum into subchambers spaced successively along the conduits and inhibit the occurrence of convection currents within the housing 70 and the heat loss associated with such currents. It has been found that the outlet manifold 16, return duct 34 and the ends of the conduits most nearly adjacent these structures, will generally be at a higher temperature than the elements of the collector immediately adjacent supply duct 36. This temperature imbalance will generate convection currents within the plenum chamber 90 unless the chamber 90 is effectively subdivided. The plurality of panels 83a-83d satisfy this need and also provide support to the window means 92 positioned above the collector 12 and add strength to the housing by reinforcing its end walls.

The insulative housing 70, which encloses the collector 12 and the supply and return ducts has a layer of insulative material 88 on its bottom and sidewalls so as to minimize heat losses from the plenum chamber 90. At the top of the housing 70 are one or more layers of transparent plastic or glass 100 and 101 which define window means through which solar energy may be incident on the collector.

It is contempated that the described collector module 10 would be manufactured in a factory environment and all its components placed within the housing 70 and the housing tightly sealed and insulated at the factory. When it is desired that a solar energy collecting system be assembled at a building or construction site, the number of required collector modules 10 is first determined and such number then delivered to the construction site for final interconnection. With the shown modules 10, it is unnecessary to open the housing 70 at the construction site and all that is required is that the housings be mounted on a firm foundation and the terminal segments of the adjacent modules interconnected.

Figure 6:
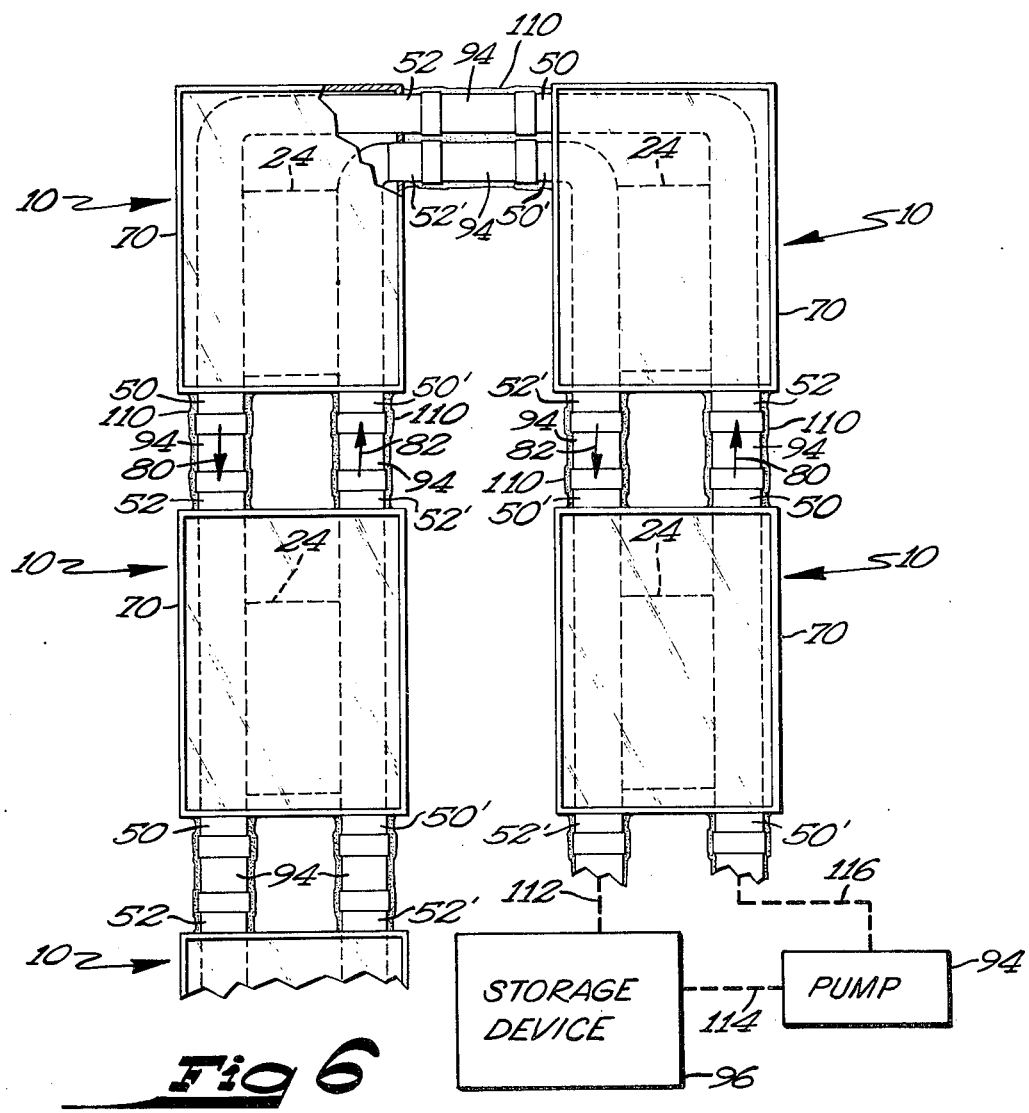
FIG. 6 is a top plan view of a plurality of interconnected, ganged collector modules in accord with the invention.

Referring now to FIG. 6, a plurality of modules 10 and 10a–10d are shown interconnected wherein all supply ducts 36 are connected in series and all return ducts 34 are connected in series. Module 10, for example, has its supply duct terminal segments 50 and 52 connected to segments 52 and 50, respectively, of trailing and leading modules 10a and 10b, respectively, by means of connectors 94 which may be of substantially any desired length. The terminal segments of the return ducts are similarly interconnected by connectors 94. The exposed surfaces of the terminal segments and the connectors 94 located outside of the housings 70 are covered with an insulative layer to minimize heat loss therefrom. The connectors 94 may be substantially identical in construction to the connectors 54, or alternatively, any known connector capable of joining the terminal segments in fluid flow relation may be used and is within the purview of the invention.

The collector module 10d nearest the structure which will utilize the heat from the modules has its supply duct 36c connected with a circulating pump 94 which moves the heat transfer medium into the supply duct and thence into the modules 10d, 10c, 10b 10 and 10a. The return duct 34 of module 10d is connected to a heat storage device 96 to and through which the heat transfer medium flows as it leaves the return duct on its way once again to the pump 94 as best shown in FIG. 6. Although the solar energy collecting apparatus shown in FIG. 6 has all of the modules connected in series, it should be understood that other connection arrangements are contemplated and combinations of series and parallel connections may be substituted when more appropriate for specific energy gathering requirements.

While it is preferred that the heat transfer medium used with the modules be air, it should be understood that other gases may be substituted and, in addition, it is contemplated that alternatively, liquid heat transfer mediums may be used with the invention.

In operation, one first determines the number of collector modules 10 which will be needed for a specific energy collecting project, and the number of required modules are then delivered to the construction site. After arranging the moduls in the preferred manner on a firm foundation as best shown in FIG. 6, the modules are interconnected for operation.

As best shown in FIG. 6, the supply ducts 36 of the modules 10 and 10a–10d are connected in series with one another. Similarly, the return ducts 34 of the shown modules are connected in series, permitting the heat transfer medium to flow continuously along the interconnected supply ducts, moe through the collectors 12 positioned between the supply and return ducts, and then enter and return along the interconnected return ducts 34 to the pump 94 and storage or use device 96. The outwardly extending terminal segments 50, 52, 50' and 52' of each module, as for example, module 10, are connected in fluid flow relation with the adjacent terminal segments of leading and trailing modules 10b and 10a respectively by connectors 94 which tightly engage the terminal segments. A layer of insulative material 110 is then applied to the exposed terminal segments and connctors between each adjacent pair of modules.

The module 10d, located nearest the building or structure in which the captures solar energy is to be utilized, has its terminal segment 52' of the return duct 34 connected through insulated pipe 112 to the storage or utilization device 96. The device 96 is connected in fluid flow relation through insulated pipe 114 with a circulating pump 94 appropriate for moving the heat transfer medium through the plurality of modules. The pump 94 is connected through insulated pipe 116 in fluid flow relation with the terminal segment 52 of supply duct 36 of the module 10d.

Because the operation of each of the modules of FIG. 6 is substantially identical, only the operation of module 10, shown in FIGS. 1-6 will be discussed in detail. Referring now to FIGS. 1-5, heat transfer medium moved by circulating pump 04 leaves the module 10b immediately upstream of module 10, enters entrance 98 of terminal segment 50 of supply duct 36 and flows in the direction of flow arrow 80. After passing through the terminal segment 50 and the connector 54, it enters the central segment 48, most of the heat transfer medium flowing continuously along the supply duct 36 and passing out of the terminal segment 52 and exit 99 toward the downwstream or trailing module 10a.

After connecting the modules as described, the flow control members 60 of the modules are adjusted by an operator to establish optimum flow through each of the interconnected modules. As a general principle, the member 84 is positioned in an open position 84 if its module is a substantial distance downstream from the circulating pump 94. The modules immediately adjacent the circulating pump have the members 60 in a more nearly closed position 86 so that most of the heat transfer medium moving along their supply ducts 36 will reach the downstream modules and flow through the collectors of the downstream modules. In this description it will be presumed that the module 10 in FIGS. 1-5 is near the circulating pump 94, and accordingly, its member 60 is positioned with the plate 64 in a position 86 whereby reduced flow of heat transfer medium enters the collector 12. To make the adjustment of the plate, the operator need not open the housing 70, but merely loosens the set screw 76 and swings the arms 72 in a counterclockwise direction about shaft 68 until the desired setting is reached, after which the set screw 76 is retightened and the arm is again rigidly retained by the track 74.

With the appropriate setting of the flow control devce 60 having been made, a predetermined amount of heat transfer fluid is diverted through the louvers 66 of the plate 64 and moves through inlet 58 and into the intake manifold 14 of the collector as shown by arrows 102.

Heat transfer medium flows along intake manifold 14 as shown by arrows 118 and then enters the individual conduits 18, the medium absorbing beat from the conduits which are continually exposed to incident solar energy 42 and 44.

The heat transfer medium leaves the conduits 18 and enters outlet manifold 16, flowing therealong in direction 104 to extension 22, from which the medium drops downwardly into the tank 24 as indicated by arrows 120. The medium flows along the tank 24 moving about baffles 26-30 as indicated by flow arrows in FIG. 4 until the fluid finally reaches exit aperture 32 and enters return duct 34 as indicated at 122.

While the heat transfer medium flows through the collector 12, it continually absorbs heat energy from the conduits 18 and from the tank 24 as already described in detail in the copending disclosure described earlier. Accordingly, the heat transfer medium entering return duct 34 is at a substantially higher temperature than the medium about to enter the collector 12 from supply duct 36. All heating of the heat transfer media, however, does not occur in the collector 12. The supply and return ducts 34 and 36, respectively, are positioned to underlie the conduits 18 and solar energy passing through the window means 92 is incident on the surfaces 40' and 40 of the return and supply ducts 34 and 36 respectively, and these ducts absorb substantial quantities of radiant energy. The heat absorbing coating on these ducts further increases the absorption of solar energy by the ducts. As best shown in FIG. 2, solar radiation 42 incident on the surfaces 40 or 40' of the ducts 36 and 34, respectively, is either absorbed by the ducts or reflected upwardly as best shown by reflected ray 44. Many of the reflected rays 44 will strike the overlying conduits 18 and increase the radiation intensity on the conduits 18 and accordingly increase the heat absorption by the conduits. It should also be understood that multiple reflections 46 occur between the conduits 18 and the surfaces 40 and 40' and these reflections serve to further direct radiant energy towards the ducts 34 and 36 for additional energy absorption.

As the heat transfer medium within the module 10 is warmed by heat absorption, the temperature of the supply and return ducts 36 and 34, respectively, increases and heat stored in the walls of these ducts moves by conduction all along the central segments 48 and 48' thereof. The insulative connectors 54 interposed between the central segments and the terminal segments of both return and supply ducts reduces the heat loss which would otherwise occur because of heat conduction from the central segments to the terminal segments. The presence of insulative barrier 53 closely surrounding the terminal segments and the connectors 54 also reduces heat loss from the plenum chamber 90 to the terminal segments 52. This isolation is particularly desirable because heat transferred to the terminal segments 50, 52, 50' and 52' will eventually be conducted out of the housing 70 and will be lost.

Temperature changes within the module 10 cause expansion and contraction of all components of the module. The flexible connectors 54 which are interposed between central andterminal segments absorb this expansion and contraction and assure minimal movement between the terminal segments and the insulative housing 70, thereby maintaining the integrity of the seals 56 between the terminal segments and the housing reducing overall mechanical strain and reducing energy loss from the housing.

The presence of the convection inhibiting panels 83a-83d subdivide the plenum chamber 90 into a plurality of subchambers isolated from one another. Because of this subdivision, the convection currents which would normally be generated between the warmer and cooler sides of the collector 12, are substantially inhibited and further energy conservation is achieved.

While the preferred embodiment of the present invention has been described, it should be understood that various changes, adaptations and modifications may be made therein without departing from the spirit of the invention and the scope of the appended claims.

What is claimed is:

1. In combination with a radiant energy collector having an inlet and outlet through which a circulatable heat transfer medium may flow, a ganging apparatus for ganging said energy collector with leading and trailing energy collectors ganging apparatus comprising:
   an insulative housing surrounding said energy collector, defining a plenum chamber within said housing, and including window means through which radiant energy may be incident on said energy collector;

a supply duct capable of passing heat transfer medium therealong, said supply duct being within said housing and extending through said housing with an entrance and exit outside said housing, said supply duct being connected in fluid flow communication with said inlet of said collector, and said supply duct entrance and exit being connectable in fluid flow communication with ganging apparatuses on the leading and trailing energy collectors, respectively;

a return duct capable of passing heat transfer medium therealong, said return duct being within said housing and extending through said housing with an entrance and exit outside said housing, said return duct being connected in fluid flow communication with said outlet of said energy collector, and said exit and entrance of said return duct being conncta ble in fluid flow communication with ganging apparatuses on the leading and trailing energy collectors, respectively, permitting the circulatable heat transfer medium to flow along said supply and return ducts to and from the ganging apparatuses of leading and trailing energy collectors and throgh said energy collector;

each said duct including a central segment and a pair of terminal segments at opposite ends of said central segment, said terminal segments being thermally insulated from said central segment to substantially reduce conductive heat loss from said central segment to said terminal segments, said terminal segments being connected in fluid flow communication with said central segment; and said central segment being wholly within said housing and said terminal segments extending through said housing to define said entrance and said exit.

2. The combination of claim 1 and further including a thermally insulative, flexible connector mounted between each said central segment and each said terminal segment to thermally insulate said central segment from said terminal segment while permitting movement of said segments caused by thermal expansion and contraction therebetween.

3. The combination of claim 2 and further including an insulative barrier fixed to and closely surrounding each said terminal segment and each said connector and extending to and engaging said housing.

4. The combination of claim 1 and further including a plurality of connectors, a said connector being mounted to and extending from at least two of said terminal segments to make said segments connectable to the ganging apparatuses of leading and trailing collectors to form a series of connected supply ducts and a series of connected return ducts along which heat transfer medium may flow.

5. The combination of claim 1 and further including flow control means between one of said ducts and said energy collector to control the quantity of heat transfer medium flowing through said energy collector.

6. A gangable radiant energy collector module for collecting radiant energy from an energy source and usable with a circulatable heat-transfer medium comprising:

an insulative housing defining plenum chamber therein and including window means through which radiant energy may enter said housing;

a supply duct capable of passing the heat transfer medium therealong;

a return duct capable of passing heat transfer medium therealong;

each of said ducts being within said housing and extending through said housing with each said duct having an entrance and exit accessible from outside said housing;

first radiation absorbing means connected in fluid-flow relation with said supply duct, said first radiation absorbing means including a plurality of radiation-absorbing, hollow-interior conducts confronting the energy source and separated from each other by slots, each said conduit capable of channeling the heat transfer medium therethrough, said conduits capable of absorbing radiation energy from the energy source and conducting such energy to heat transfer medium within said hollow interior of said conduits;

second radiation absorbing means connected in fluid flow relation with said first radiation absorbing means to permit flow of heat transfer medium therebetween and connected in fluid flow relation with said return duct to permit flow of heat transfer medium between said second radiation absorbing means and said return duct; and said second radiation absorbing means and said supply and return ducts being positioned below and confronting said slots and also confronting the energy source through said slots, said second radiation absorbing means and said supply and return ducts thereby receiving and absorbing radiant energy passing through said slots and incident on said second radiation absorbing means and said ducts so as to conduct the energy to the heat transfer medium, and said second radiation absorbing means and said ducts collectively defining reflector means for reflecting radiant energy not absorbed by said second radiation absorbing means and by said ducts toward said first radiation absorbing means, thereby increasing radiation intensity at and absorption by said first radiation absorbing means.

7. The gangable radiant energy collector module of claim 6 wherein said reflector means includes a generally planar energy absorbing surface on each of said ducts substantially confronting said first radiation absorbing means and the energy source.

8. The gangable radiant energy collector module of claim 6 and further including flow control means positioned between one of said radiation absorbing means and one of said ducts to control the flow of heat transfer medium moving between said ducts and said first and second radiation absorbing means.

9. The gangable radiant energy collector module of claim 8 wherein said flow control means includes a plate selectively swingably mounted relative to one of said ducts to move between a first position, wherein flow of heat transfer medium passes freely between one of said ducts and one of said radiation absorbing means, and a second position, wherein said plate inhibits flow of heat transfer medium between one of said ducts and one of said radiation absorbing means.

10. The gangable radiant energy collector module of claim 9 wherein said plate has a plurality of louvers passing therethrough to direct heat transfer medium flow from one of said ducts into one of said radiation absorbing means.

11. The gangable radiant energy collector module of claim 9 wherein said flow control means further includes an arm fixed to said plate and extending outwardly from the plate through said housing to permit an operator to selectively swing said plate from outside said housing by manipulating said arm, thereby controlling heat transfer medium flow through said first and said second radiation absorbing means without entering said housing.

12. The gangable radiant energy collector module of claim 6 and further including a plurality of substantially upright, spaced-apart convection inhibiting panels positioned within said plenum chamber, extending transversely to said conduits and having apertures through which said conduits extend, said convection inhibiting panels dividing said plenum chamber into a plurality of successive subchambers spaced along said conduits and inhibiting convection current flow between said subchambers of said plenum chamber.

13. The gangable radiant energy collector module of claim 12 wherein said convection inhibiting panels are substantially mutually parallel and are generally transparent.

14. The gangable radiant energy collector module of claim 12 wherein said conduits are mutually parallel and said convection inhibiting panels are substantially perpendicular to said conduits.

15. A gangable radiant energy collector module for collecting radiant energy from an energy source and usable with a circulatable heat transfer medium comprising:
- an insulative housing defining a plenum chamber therein and including window means through which radiant energy may enter said housing;
- a supply duct capable of passing the heat transfer medium therealong;
- a return duct capable of passing heat transfer medium therealong;
- each of said ducts being within said housing and extending through said housing with each said duct having an entrance and exit accessible from outside said housing;
- first radiation absorbing means connected in fluid-flow relation with said supply duct, said first radiation absorbing means including at least one radiation-absorbing, hollow-interior conduits confronting the energy source, said conduit capable of channeling the heat transfer medium therethrough and capable of absorbing radiation energy from the energy source and conducting such energy to heat transfer medium within said hollow interior of said conduit;
- second radiation absorbing means connected in fluid flow relation with said first radiation absorbing means to permit flow of heat transfer medium therebetween and connected in fluid flow relation with said return duct to permit flow of heat transfer medium between said second radiation absorbing means and said return duct; and
- said second radiation absorbing means and said supply and return ducts being positioned below and confronting said conduit and also confronting the energy source, said second radiation absorbing means and said supply and return ducts thereby receiving and absorbing radiant energy from the energy source and incident on said second radiation absorbing means and said ducts so as to conduct the energy to the heat transfer medium, and said second radiation absorbing means and said ducts collectively defining reflector means for reflecting radiant energy not absorbed by said second radiation absorbing means and by said ducts toward said first radiation absorbing means thereby increasing radiation intensity at and absorption by said first radiation absorbing means.

* * * * *

UNITED STATES PATENT AND TRADEMARK OFFICE
CERTIFICATE OF CORRECTION

PATENT NO. : 4,117,830
DATED : October 3, 1978
INVENTOR(S) : Jag M. Bansal; Anil Kumar It is certified that error appears in the above-identified patent and that said Letters Patent are hereby corrected as shown below:

```
Column  2, line 32, Delete "extension" and substitute --extensive--

Column  3, line 15, Delete "of" and substitute --to--.
Column  4, line 34, Delete "4" and substitute --14--.
Column  6, line 20, Delete "dut" and substitute --duct--.
Column  6, line 28, Delete "mans" and substitute --means--.
Column  8, line 19, Delete "36c" and substitute --36--.
Column  8, line 41, Delete "moduls" and substitute --modules--.
Column  8, line 49, Delete "moe" and substitute --move--.
Column  8, line 60, Insert --94-- after connectors.
Column  8, line 62, Delete "captures" and substitute --captured--.
Column  9, line  8, Delete "04" and substitute --94--.
Column  9, line 41, Delete "devce" and substitute --device--.
Column  9, line 48, Delete "beat" and substitute --heat--.
Column 10, line 20, Delete "heat" and substitute --energy--.
Column 10, line 63, Insert --each of which have a said ganging
                    apparatus, each said--after collectors.
Column 11, Line 17, Delete "conncta-" and substitute --connecta--
Column 11, Line 24, Delete "throgh" and substitute --through--.
```

Signed and Sealed this

Twenty-fourth Day of July 1979

[SEAL]

Attest:

LUTRELLE F. PARKER
Attesting Officer
Acting Commissioner of Patents and Trademarks